United States Patent
Liu et al.

(10) Patent No.: US 11,286,425 B2
(45) Date of Patent: Mar. 29, 2022

(54) METHOD FOR PREPARING NEEDLE COKE FOR ULTRA-HIGH POWER (UHP) ELECTRODES FROM HEAVY OIL

(71) Applicant: China University of Petroleum, Qingdao (CN)

(72) Inventors: Dong Liu, Qingdao (CN); Xin Gong, Qingdao (CN); Bin Lou, Qingdao (CN); Jun Li, Qingdao (CN); Hui Du, Qingdao (CN); Zhihao Li, Qingdao (CN)

(73) Assignee: CHINA UNIVERSITY OF PETROLEUM, Qingdao (CN)

( * ) Notice: Subject to any disclaimer, the term of this patent is extended or adjusted under 35 U.S.C. 154(b) by 0 days.

(21) Appl. No.: 17/423,488

(22) PCT Filed: Jul. 10, 2020

(86) PCT No.: PCT/CN2020/101357
§ 371 (c)(1),
(2) Date: Jul. 16, 2021

(87) PCT Pub. No.: WO2021/232560
PCT Pub. Date: Nov. 25, 2021

(65) Prior Publication Data
US 2022/0041934 A1 Feb. 10, 2022

(30) Foreign Application Priority Data
May 22, 2020 (CN) .......................... 202010439340.X

(51) Int. Cl.
*B01D 15/34* (2006.01)
*B01D 15/36* (2006.01)
*B01J 39/04* (2017.01)
*B01J 39/20* (2006.01)
*B01J 39/26* (2006.01)
*B01J 41/04* (2017.01)
*B01J 41/14* (2006.01)
*B01J 41/20* (2006.01)
*C10B 55/00* (2006.01)
*C10B 57/02* (2006.01)
*C10G 55/04* (2006.01)
*H05B 7/06* (2006.01)

(52) U.S. Cl.
CPC .............. *C10B 55/00* (2013.01); *B01D 15/34* (2013.01); *B01D 15/361* (2013.01); *B01J 39/04* (2013.01); *B01J 39/20* (2013.01); *B01J 39/26* (2013.01); *B01J 41/04* (2013.01); *B01J 41/14* (2013.01); *B01J 41/20* (2013.01); *C10B 57/02* (2013.01); *C10G 55/04* (2013.01); *H05B 7/06* (2013.01); *H05B 2203/017* (2013.01)

(58) Field of Classification Search
CPC ........ B01D 15/34; B01D 15/361; B01J 39/04; B01J 39/20; B01J 39/26; B01J 41/04; B01J 41/14; B01J 41/20; C10B 55/00; C10B 57/02; C10G 55/04; H05B 7/06; H05B 2203/017
See application file for complete search history.

(56) References Cited

U.S. PATENT DOCUMENTS

2010/0176029 A1* 7/2010 Subbiah ............... C10G 25/003
208/91
2011/0186478 A1 8/2011 Tano et al.

FOREIGN PATENT DOCUMENTS

| CN | 102149791 A | 8/2011 |
| CN | 106403579 A | 2/2017 |
| CN | 106544045 A | 3/2017 |
| CN | 106566570 A | 4/2017 |
| CN | 106635142 A | 5/2017 |
| CN | 110066675 A | 7/2019 |
| CN | 110066676 A | 7/2019 |

OTHER PUBLICATIONS

Yeson, "UHP Graphite Electrode". Accessed Dec. 9, 2021.*
Wanzhen Lu, et al., Modern Physical Analysis Method and Its Application in Petroleum Industry, 1984, pp. 212-220.
Zhining Xia, et al., Chromatography, 2012, pp. 206-208, Chongqing University Press.

* cited by examiner

*Primary Examiner* — Benjamin L Lebron
(74) *Attorney, Agent, or Firm* — Bayramoglu Law Offices LLC

(57) ABSTRACT

A method for preparing needle coke for ultra-high power (UHP) electrodes from heavy oil is provided. In this method, heavy oil is used as a raw material. The size exclusion chromatography (SEC) is conducted with polystyrene (PS) as a packing material to separate out specific components with a relative molecular weight of 400 to 1,000. The ion-exchange chromatography (IEC) is conducted to remove acidic and alkaline components to obtain a neutral raw material. The neutral raw material is subjected to two-stage consecutive carbonization to obtain green coke, and the green coke is subjected to high-temperature calcination to obtain the needle coke for UHP electrodes. The needle coke has a true density of more than 2.13 $g/cm^3$ and a coefficient of thermal expansion (CTE) of $\leq 1.15 \times 10^{-6}/°$ C. at 25° C. to 600° C.

8 Claims, No Drawings

METHOD FOR PREPARING NEEDLE COKE FOR ULTRA-HIGH POWER (UHP) ELECTRODES FROM HEAVY OIL

CROSS REFERENCE TO THE RELATED APPLICATIONS

This application is the national stage entry of International Application No. PCT/CN2020/101357, filed on December Jul. 10, 2020, which is based upon and claims priority to Chinese Patent Application No. 202010439340.X filed on May 22, 2020, the entire contents of which are incorporated herein by reference.

TECHNICAL FIELD

The present disclosure relates to a method for preparing needle coke for ultra-high power (UHP) electrodes from heavy oil, and in particular to a method for preparing a needle coke material for UHP electrodes by subjecting the heavy oil to size exclusion chromatography (SEC), ion-exchange chromatography (IEC), and two-stage consecutive carbonization. The present disclosure belongs to the field of preparation of advanced new carbon materials.

BACKGROUND

With the development of aerospace technology, metallurgical technology, and chemical engineering technology, UHP electric furnace steelmaking has become the mainstream development trend of electric furnace steelmaking worldwide, which greatly increases the demand for high-quality needle coke, and also causes increasingly strict requirements on graphite electrode frameworks made of needle coke. Compared with ordinary graphite electrodes, UHP electrodes made of needle coke can shorten the smelting time and reduce the power consumption of steelmaking, thereby exponentially improving the production capacity.

Needle coke, a carbonization product of coal-derived pitch or petroleum-derived pitch, is a new carbon material with metallic luster and many pores, and has a silver-gray appearance. Needle coke is one of the rapidly developed high-quality carbon materials. Needle coke's appearance structure has a flow texture and a small number of slightly oval macropores. The length-width ratio of particles thereof is relatively large. The texture thereof is slightly fibrous or needle-like, and is lubricative to the touch. Needle coke is used as a raw material for producing high-end carbon products such as UHP electrodes, special carbon materials, carbon fibers, and composites thereof. In order to prepare high power (HP) electrodes and UHP electrodes used in the modern metallurgical industry, the needle coke for electrodes generally needs to have high true density, a low coefficient of thermal expansion (CTE), high strength, low resistivity, and prominent oxidation resistance. The quality of a needle coke electrode material depends on the selection of a raw material and the optimization of a coking process.

Generally, a raw material for preparing needle coke for UHP electrodes should meet the following requirements: high aromatic (not including macromolecular fused-ring aromatics) content (30% to 50%), heptane insoluble content <2%, Bureau of Mines Correlation Index (BMCI)≥120, ash content <0.05%, sulphur (S) content ≤0.5%, nickel (Ni)≤50 µg/g, vanadium (V)≤50 µg/g, and the like. A production process of needle coke mainly includes raw material pretreatment, carbonization for coking, and calcination. A method for the raw material pretreatment includes hydrogenation, two-stage thermal polycondensation, solvent treatment, and so on. A raw material such as Fluid Catalytic Cracking (FCC) slurry oil is subject to pyrolysis and polycondensation to form mesophase spherules during a carbonization process, and the mesophase spherules form a wide-area mesophase through growth, merging, and collision. The content and nature of the mesophase and the matching degree of the mesophase with an "airflow coking" effect in the subsequent curing process are the key to the quality of needle coke. The calcination is conducted by calcining needle coke at about 1,400° C. to eliminate volatile components, thereby improving the density, mechanical strength, and electrical conductivity thereof.

The current process mainly has the following deficiencies. First, in the process of raw material pretreatment, a catalyst solid powder and other non-ideal components in an oil raw material (a linear polycyclic (3-ring or 4-ring) aromatic hydrocarbon (PAH) rich in short side chains is a high-quality raw material for preparing a needle coke material for UHP electrodes) are not conducive to the formation of a high-quality mesophase. Secondly, in the process of carbonization for coking, the insufficient control of a liquid phase carbonization process and an airflow coking process leads to the inadequate growth of a high-quality crystal structure and a low anisotropic fiber structure content, such that the needle coke for UHP electrodes cannot be produced stably. In addition, many sulfur-containing compounds and nitrogen-containing compounds in green coke will escape during the high-temperature calcination process, that is, expansion occurs, which leads to cracks in a finished product of the needle coke and reduces the quality of needle coke. Therefore, it is particularly important to remove acidic and alkaline components from an oil raw material.

At present, the needle coke for electrodes produced in China mainly has disadvantages such as low true density and a large CTE, and thus cannot completely replace imported needle coke. The main reason is that, in the production process, process conditions for selection, pretreatment, and carbonization for coking of a raw material need to be further improved.

SUMMARY

The present disclosure is intended to overcome the deficiencies in the prior art and provide a method for preparing needle coke for UHP electrodes from heavy oil. In the method, heavy oil (a raw material) is pretreated by SEC and IEC to obtain a neutral raw material with a narrow molecular weight distribution, which improves a pretreatment method, expands a source of raw materials, and optimizes the production process. The two-stage consecutive carbonization method is used to produce high-quality needle coke for UHP electrodes having high true density (>2.13 g/cm$^3$) and a low CTE (<1.15×10$^{-6}$/° C.).

The method for preparing needle coke for UHP electrodes from heavy oil provided by the present disclosure includes the following steps: (1) selecting heavy oil as a raw material; (2) subjecting the raw material to SEC to separate out components with a relative molecular weight of 400 to 1,000; (3) removing acidic and alkaline components by IEC to obtain a neutral raw material; (4) subjecting the neutral raw material to first-stage carbonization for 1 h to 6 h at a pressure of 2 MPa to 8 MPa and a temperature of 400° C. to 450° C.; (5) after the first-stage carbonization is completed, heating a reactor to 460° C. to 520° C., conducting second-stage carbonization for 6 h to 12 h at a pressure of 0 MPa to 2 MPa to obtain a green coke product, and subjecting the green coke product to high-temperature calcination to obtain the needle coke for the UHP electrodes.

In the present disclosure, a packing material used for the SEC is an organogel, and the organogel is one selected from the group consisting of polystyrene (PS), polyvinyl acetate (PVA), cross-linked dextran, and cross-linked polyacrylamide (CL-PAM), and preferably PS. An eluate used for the SEC is one selected from the group consisting of hexane, tetrahydrofuran (THF), dichloromethane (DCM), dioxane, cyclohexane, and dichloroethane (DCE), and preferably THF. The packing material has a pore size of 500 Å to 1,000 Å. A gel column used for the SEC has a diameter of 50 mm to 100 mm and a height of 800 mm to 1,000 mm.

In the present disclosure, resins used for the IEC is a macroporous cation-exchange resin prepared by introducing a sulfonyl group or a carboxyl group into a structure or a macroporous anion-exchange resin prepared by introducing quaternary ammonium cation or tertiary amine cation into a structure. The structures of the cation-exchange resin and the anion-exchange resin are one or more selected from the group consisting of PS, polyethylene (PE), polymethyl methacrylate (PMMA), and styrene-divinylbenzene copolymer, and preferably styrene-divinylbenzene copolymer. The packed column for the IEC has a diameter of 10 mm to 20 mm, a length of 500 mm to 1,000 mm, a flow rate of 2 ml/min, and a temperature of 50° C.

In the present disclosure, the neutral raw material has a nitrogen (N) content of less than 0.5% and an S content of less than 0.3%; and the first-stage carbonization and the second-stage carbonization are two consecutive stages of carbonization.

More specifically, the present disclosure adopts the following technical solutions: (1) The heavy oil raw material is one or more selected from the group consisting of petroleum atmospheric residue, petroleum vacuum residue, petroleum heavy distillate oil, medium and low-temperature coal tar heavy fractions, high-temperature coal tar distillate, catalytic cracking slurry oil, hydrocracking tail oil, and ethylene tar (ET). (2) The raw material is preheated to 50° C. and then subjected to SEC, where PS is used as a packing material with a pore size of 500 Å to 1,000 Å, a gel column used has a diameter of 50 mm to 100 mm, a height of 800 mm to 1,000 mm, and a temperature of 50° C., and THF is used as an eluate, with a flow rate of 1.5 ml/min. (3) The raw material obtained after the treatment in step (2) passes through a macroporous cation-exchange resin prepared by introducing a sulfonyl group into a structure of styrene-divinylbenzene copolymer and then passes through a macroporous anion-exchange resin prepared by introducing quaternary ammonium cation into a structure of styrene-divinylbenzene copolymer to obtain a neutral raw material, where a packed column for the IEC has a diameter of 10 mm to 20 mm, a length of 500 mm to 1,000 mm, and a flow rate of 2 ml/min, and a thermostatic water bath has a temperature of 50° C. (4) The neutral raw material obtained in step (3) is added to an autoclave and subjected to first-stage carbonization for 1 h to 6 h at a pressure of 2 MPa to 8 MPa and a temperature of 400° C. to 450° C. in a nitrogen atmosphere or an inert gas atmosphere. (5) After the first-stage carbonization is completed, the autoclave is heated to 460° C. to 520° C., and the material is subjected to second-stage carbonization for 6 h to 12 h at a pressure of 0 MPa to 2 MPa to obtain a green coke product, and the green coke product is subjected to high-temperature calcination to obtain needle coke for UHP electrodes.

Furthermore, in step (2), 100 ml of THF is mixed with 300 g of heavy oil, a resulting mixture is preheated to 50° C. and then added to the gel column multiple times, and an effluent oil is collected, where a temperature of the thermostatic water bath is maintained at 50° C., and the top of the gel column is pressurized to ensure a flow rate of 1.5 ml/min.

Furthermore, in step (3), a macroporous cation-exchange resin is added to the packed column for IEC at a column height of 800 mm and wetted with 50 ml of THF, the effluent oil obtained in step (2) is added to the gel column to collect an effluent oil A, where a flow rate is maintained at 2 ml/min. A macroporous anion-exchange resin is added to the packed column for IEC at a column height of 800 mm and wetted with 50 ml of THF, the effluent oil A is added to the gel column to collect an effluent oil B, where a flow rate is maintained at 2 ml/min. THF is distilled out from the effluent oil B to obtain a neutral raw material with a narrow molecular weight distribution. Preferably, the neutral raw material has an N content of less than 0.5% and an S content of less than 0.3%.

Furthermore, continuous uniform stirring is required during the reaction processes in steps (4) and (5).

Furthermore, a product produced in step (5) is subjected to high-temperature calcination to obtain needle coke for UHP electrodes, which has a true density of >2.13 g/cm$^3$, an ash content of ≤0.3, and a CTE of ≤1.15×10$^{-6}$/° C. at 25° C. to 600° C.

The present disclosure also provides a product prepared by the method for preparing needle coke for UHP electrodes from heavy oil, and use of the product in the preparation of a graphite electrode.

The present disclosure adopts a combined process of SEC pretreatment, IEC pretreatment and two-stage consecutive carbonization. The SEC is conducted to remove hydrocarbons with small and large molecular weights in the raw material, thus narrowing a molecular weight distribution of the reaction raw material and avoiding excessive carbonization of large molecules and incomplete polycondensation of small molecules during a reaction process under the same reaction time, pressure, and temperature. In this way, the relative molecular weight of the hydrocarbon is controlled at 400 to 1,000, so as to control the uniformity of the reaction raw material at a molecular scale.

The IEC is conducted to remove acidic and alkaline components in the raw material. The acidic components are mostly sulfur-containing compounds, and the alkaline components are mainly nitrogen-containing compounds. If there is a sulfur atom on the main chain or side chain of a fatty compound, a carbon-hydrogen bond connected to the sulfur atom is greatly weakened and easy to break, resulting in too-fast thermal reaction. The nitrogen heteroatom in an aromatic substituent increases the polarity of a molecule, which greatly reduces the stability of the compound. When a heteroatom content is high, the mesophase nucleation and spherule growth are very fast during the carbonization. It can be observed under a microscope that the mesophase mainly includes fine anisotropic mosaic structures and also has some coarse anisotropic mosaic structures and coarse fibrous structures, which is not conducive to the formation of high-quality mesophase pitch.

The first-stage carbonization is conducted for a short time (1 h to 6 h) at a low temperature (400° C. to 450° C.) and a high pressure (2 MPa to 8 MPa). Under the protection of a N2 atmosphere, the low temperature causes the raw material to undergo shallow pyrolysis and polycondensation, and the high pressure inhibits the escape of small-molecule hydrocarbons, such that the reaction system has a low viscosity, thereby ensuring the fluidity of a product from the first-carbonization. With low temperature, high pressure, and short time as reaction conditions, the first-stage carbonization is mild and moderate, which ensures a high yield of an intermediate product from the first-stage carbonization, makes microcrystals initially arranged and oriented, and lays a foundation for the second-stage carbonization. The second-stage carbonization is conducted for a long time (6 h to 12 h) at a high temperature (460° C. to 520° C.) and a low pressure (0 MPa to 2 MPa), which is deep carbonization under the protection of the N2 atmosphere. Before the deep carbonization, microcrystals in the reaction raw material have begun to take shape, and have specified orientation and crystallinity degree. The high temperature causes reaction molecules to undergo deep pyrolysis and thermal polycondensation, where the reaction molecules are subjected to orderly orientation and crystallinity degree and orientation degree gradually increase with the reaction progress. The long reaction time ensures the sufficient development and orientation of crystals. Moreover, a small-molecule light hydrocarbon gas produced is discharged in a low pressure environment, and the discharge of small molecules leads to the formation of a stable gas flow. Through a long-term reaction, sufficient gas flow coking is conducted to obtain a needle green coke product with a uniaxially-oriented streamline mesophase texture.

Compared with the existing preparation methods, the present disclosure has the following advantages:

(1) The present disclosure involves a raw material with abundant sources, a low cost, a simple operation process, low energy consumption, a reasonable design, a simple production process, and low requirements on equipment, which is easily industrialized.

(2) In the method, the SEC and IEC can effectively improve the molecular weight distribution, composition distribution, and element distribution of the raw material, that is, light components that are not conducive to polycondensation and macromolecular components and heteroatom-containing components that are prone to excessive carbonization are removed, thus ensuring uniformity of the molecular weight of the raw material.

(3) The use of two-stage consecutive carbonization allows the adequate reaction of the raw material and ensures the full orderly growth of crystals. The first-stage carbonization is conducted for a short time at a low temperature and a high pressure, which can promote the full development of the mesophase structure, such that microcrystals are initially arranged and orientated. The second-stage carbonization is conducted for a long time at a high temperature and a low pressure, which allows the full pyrolysis and polycondensation of the raw material, promotes the full development and orderly orientation and arrangement of crystal structures, and enables full airflow coking conducive to the formation of a uniaxial streamline optically-anisotropic needle structure. Finally, the needle structure is subjected to high-temperature calcination to obtain needle coke for UHP electrodes.

DETAILED DESCRIPTION OF THE EMBODIMENTS

The method for preparing needle coke for UHP electrodes from heavy oil provided in the present disclosure is further described below with reference to examples.

Example 1

(1) A glass wool pad was placed at the bottom of a gel column with a diameter of 60 mm and a height of 1,000 mm, PS adds up to a column height of 800 mm, and a glass wool pad was placed at the top; and the chromatographic column was wetted with 50 ml of THF, 100 ml of THF and 300 g of catalytic cracking slurry oil were mixed, preheated to 50° C., and added into the gel column multiple times, and an effluent oil was collected, where a temperature of a thermostatic water bath was maintained at 50° C., and the top of the column was pressurized to ensure a flow rate of 1.5 ml/min. (2) A glass wool pad was placed at the bottom of a gel column with a diameter of 15 mm and a height of 1,000 mm, a macroporous cation-exchange resin prepared by introducing a sulfonyl group into a structure of styrene-divinylbenzene copolymer adds up to a column height of 800 mm, and a glass wool pad was placed at the top; and the column was wetted with 50 ml of THF, the effluent oil obtained in step (1) was added into the gel column, and an effluent oil was collected, where the top was pressurized to ensure a flow rate of 2 ml/min. (3) A glass wool pad was placed at the bottom of a gel column with a diameter of 15 mm and a height of 1,000 mm, a macroporous anion-exchange resin prepared by introducing quaternary ammonium cation into a structure of styrene-divinylbenzene copolymer adds up to a column height of 800 mm, and a glass wool pad was placed at the top; the column was wetted with 50 ml of THF, the effluent oil obtained in step (2) was added into the gel column, and an effluent oil was collected, where the top was pressurized to ensure a flow rate of 2 ml/min; and the THF was distilled out from the effluent oil to obtain a neutral raw material with a narrow molecular weight distribution. (4) 100 g of the neutral raw material obtained in step (3) was added to an autoclave, and nitrogen was introduced to replace air 3 times, with a flow rate of 2 L/min; a temperature was increased to 410° C. at a uniform rate, a reaction pressure was maintained at 4 MPa, and stirring was started to conduct carbonization for 2 h; and after the first-stage carbonization was completed, a temperature was further increased to 460° C., the pressure was reduced to and maintained at 0 MPa, and carbonization was conducted for 6 h to obtain needle coke for UHP electrodes. The needle coke a true density of 2.20 g/cm$^3$, an ash content of 0.25, and a CTE of $1.12 \times 10^{-6}$/° C.

Example 2

(1) A glass wool pad was placed at the bottom of a gel column with a diameter of 60 mm and a height of 1,000 mm, PS adds up to a column height of 750 mm, and a glass wool pad was placed at the top; and the chromatographic column was wetted with 50 ml of THF, 100 ml of THF and 300 g of catalytic cracking slurry oil were mixed, preheated to 50° C., and added into the gel column multiple times, and an effluent oil was collected, where a temperature of a thermostatic water bath was maintained at 50° C., and the top of the column was pressurized to ensure a flow rate of 1.5 ml/min. (2) A glass wool pad was placed at the bottom of a gel column with a diameter of 15 mm and a height of 1,000 mm, a macroporous cation-exchange resin prepared by introducing a sulfonyl group into a structure of styrene-divinylbenzene copolymer adds up to a column height of 750 mm, and a glass wool pad was placed at the top; and the column was wetted with 50 ml of THF, the effluent oil obtained in step (1) was added into the gel column, and an effluent oil was collected, where the top was pressurized to ensure a flow rate of 2 ml/min. (3) A glass wool pad was placed at the bottom of a gel column with a diameter of 15 mm and a height of 1,000 mm, a macroporous anion-exchange resin prepared by introducing quaternary ammonium cation into a structure of styrene-divinylbenzene copolymer adds up to a column height of 750 mm, and a glass wool pad was placed at the top; the column was wetted with 50 ml of THF, the effluent oil obtained in step (2) was added into the gel column, and an effluent oil was collected, where the top was pressurized to ensure a flow rate of 2 ml/min; and the THF was distilled out from the effluent oil to obtain a neutral raw material with a narrow molecular weight distribution. (4) 100 g of the neutral raw material obtained in step (3) was added to an autoclave, and nitrogen was introduced to replace air 3 times, with a flow rate of 2 L/min; a temperature was increased to 420° C. at a uniform rate, a reaction pressure was maintained at 5 MPa, and stirring was started to conduct carbonization for 3 h; and after the first-stage carbonization was completed, a temperature was further increased to 470° C., the pressure was reduced to and maintained at 0 MPa, and carbonization was conducted for 7 h to obtain needle coke for UHP electrodes. The needle coke a true density of 2.18 g/cm$^3$, an ash content of 0.2, and a CTE of $1.10 \times 10^{-6}$/° C.

Example 3

(1) A glass wool pad was placed at the bottom of a gel column with a diameter of 60 mm and a height of 1,000 mm, PS adds up to a column height of 850 mm, and a glass wool pad was placed at the top; and the chromatographic column was wetted with 50 ml of THF, 100 ml of THF and 300 g of catalytic cracking slurry oil were mixed, preheated to 50° C., and added into the gel column multiple times, and an effluent oil was collected, where a temperature of a thermostatic water bath was maintained at 50° C., and the top of the column was pressurized to ensure a flow rate of 1.5 ml/min. (2) A glass wool pad was placed at the bottom of a gel column with a diameter of 15 mm and a height of 1,000 mm, a macroporous cation-exchange resin prepared by introducing a sulfonyl group into a structure of styrene-divinylbenzene copolymer adds up to a column height of 850 mm, and a glass wool pad was placed at the top; and the column was wetted with 50 ml of THF, the effluent oil obtained in step (1) was added into the gel column, and an effluent oil was collected, where the top was pressurized to ensure a flow rate of 2 ml/min. (3) A glass wool pad was placed at the bottom of a gel column with a diameter of 15 mm and a height of 1,000 mm, a macroporous anion-exchange resin prepared by introducing quaternary ammonium cation into a structure of styrene-divinylbenzene copolymer adds up to a column height of 850 mm, and a glass wool pad was placed at the top; the column was wetted with 50 ml of THF, the effluent oil obtained in step (2) was added into the gel column, and an effluent oil was collected, where the top was pressurized to ensure a flow rate of 2 ml/min; and the THF was distilled out from the effluent oil to obtain a neutral raw material with a narrow molecular weight distribution. (4) 100 g of the neutral raw material obtained in step (3) was added to an autoclave, and nitrogen was introduced to replace air 3 times, with a flow rate of 2 L/min; a temperature was increased to 430° C. at a uniform rate, a reaction pressure was maintained at 6 MPa, and stirring was started to conduct carbonization for 4 h; and after the first-stage carbonization was completed, a temperature was further increased to 480° C., the pressure was reduced to and maintained at 0 MPa, and carbonization was conducted for 8 h to obtain needle coke for UHP electrodes. The needle coke had a true density of 2.30 g/cm$^3$, an ash content of 0.25, and a CTE of $1.06 \times 10^{-6}$/° C.

Example 4

(1) A glass wool pad was placed at the bottom of a gel column with a diameter of 60 mm and a height of 1,000 mm, PS adds up to a column height of 900 mm, and a glass wool pad was placed at the top; and the chromatographic column was wetted with 50 ml of THF, 100 ml of THF and 300 g of catalytic cracking slurry oil were mixed, preheated to 50° C., and added into the gel column multiple times, and an effluent oil was collected, where a temperature of a thermostatic water bath was maintained at 50° C., and the top of the column was pressurized to ensure a flow rate of 1.5 ml/min. (2) A glass wool pad was placed at the bottom of a gel column with a diameter of 15 mm and a height of 1,000 mm, a macroporous cation-exchange resin prepared by introducing a sulfonyl group into a structure of styrene-divinylbenzene copolymer adds up to a column height of 900 mm, and a glass wool pad was placed at the top; and the column was wetted with 50 ml of THF, the effluent oil obtained in step (1) was added into the gel column, and an effluent oil was collected, where the top was pressurized to ensure a flow rate of 2 ml/min. (3) A glass wool pad was placed at the bottom of a gel column with a diameter of 15 mm and a height of 1,000 mm, a macroporous anion-exchange resin prepared by introducing quaternary ammonium cation into a structure of styrene-divinylbenzene copolymer adds up to a column height of 900 mm, and a glass wool pad was placed at the top; the column was wetted with 50 ml of THF, the effluent oil obtained in step (2) was added into the gel column, and an effluent oil was collected, where the top was pressurized to ensure a flow rate of 2 ml/min; and the THF was distilled out from the effluent oil to obtain a neutral raw material with a narrow molecular weight distribution. (4) 100 g of the neutral raw material obtained in step (3) was added to an autoclave, and nitrogen was introduced to replace air 3 times, with a flow rate of 2 L/min; a temperature was increased to 440° C. at a uniform rate, a reaction pressure was maintained at 7 MPa, and stirring was started to conduct carbonization for 6 h; and after the first-stage carbonization was completed, a temperature was further increased to 490° C., the pressure was reduced to and maintained at 0 MPa, and carbonization was conducted for 9 h to obtain needle coke for UHP electrodes. The needle coke had a true density of 2.23 g/cm$^3$, an ash content of 0.15, and a CTE of $1.01 \times 10^{-6}$/° C.

What is claimed is:
1. A method for preparing needle coke for ultra-high power (UHP) electrodes from heavy oil, comprising the following steps:
   (1) selecting heavy oil as a raw material;
   (2) subjecting the raw material to size exclusion chromatography (SEC) to separate out components with a relative molecular weight of 400 to 1,000;
   (3) removing acidic and alkaline components by ion-exchange chromatography (IEC) to obtain a neutral raw material;
   (4) subjecting the neutral raw material to first-stage carbonization for 1 h to 6 h at a pressure of 2 MPa to 8 MPa and a temperature of 400° C. to 450° C.;
   (5) after the first-stage carbonization is completed, heating a reactor to 460° C. to 520° C., conducting second-stage carbonization for 6 h to 12 h at a pressure of 0 MPa to 2 MPa to obtain a green coke product, and subjecting the green coke product to high-temperature calcination to obtain the needle coke for the UHP electrodes;

wherein a packing material used for the SEC is an organogel, and the organogel is one from the group consisting of polystyrene (PS), polyvinyl acetate (PVA), cross-linked dextran, and cross-linked polyacrylamide (CL-PAM); an eluate used for the SEC is one from the group consisting of hexane, tetrahydrofuran (THF), dichloromethane (DCM), dioxane, cyclohexane, and dichloroethane (DCE);

in step (3), the raw material obtained after the treatment in step (2) passes through a macroporous cation-exchange resin prepared by introducing a sulfonyl group or a carboxyl group into a structure and then passes through a macroporous anion-exchange resin prepared by introducing quaternary ammonium cation or tertiary amine cation into a structure to obtain the neutral raw material; the structures of the cation-exchange resin and the anion-exchange resin are one or more from the group consisting of PS, polyethylene (PE), polymethyl methacrylate (PMMA), and styrene-divinylbenzene copolymer.

2. The method for preparing the needle coke for the UHP electrodes from the heavy oil according to claim 1, wherein the heavy oil used as the raw material comprises one or more from the group consisting of petroleum atmospheric residue, petroleum vacuum residue, petroleum heavy distillate oil, medium and low-temperature coal tar heavy fractions, high-temperature coal tar distillate, catalytic cracking slurry oil, hydrocracking tail oil, and ethylene tar (ET).

3. The method for preparing the needle coke for the UHP electrodes from the heavy oil according to claim 1, wherein the packing material used for the SEC has a pore size of 500 Å to 1,000 Å; and a gel column used for the SEC has a diameter of 50 mm to 100 mm and a height of 800 mm to 1,000 mm.

4. The method for preparing the needle coke for the UHP electrodes from the heavy oil according to claim 1, wherein in the SEC, the packing material is PS and the eluate is THF.

5. The method for preparing the needle coke for the UHP electrodes from the heavy oil according to claim 1, wherein a packed column for the IEC has a diameter of 10 mm to 20 mm, a length of 500 mm to 1,000 mm, a flow rate of 2 ml/min, and a temperature of 50° C.

6. The method for preparing the needle coke for the UHP electrodes from the heavy oil according to claim 1, wherein step (3) comprises: enabling the raw material obtained after the treatment in step (2) to pass through the macroporous cation-exchange resin prepared by introducing the sulfonyl group into the structure made of the styrene-divinylbenzene copolymer and then pass through the macroporous anion-exchange resin prepared by introducing the quaternary ammonium cation into the structure made of the styrene-divinylbenzene copolymer to obtain the neutral raw material.

7. The method for preparing the needle coke for the UHP electrodes from the heavy oil according to claim 1, wherein the neutral raw material has an N content of less than 0.5%, an S content of less than 0.3%, and a relative molecular weight of 400 to 1,000; and the first-stage carbonization and second-stage carbonization are two consecutive stages of carbonization.

8. The method for preparing the needle coke for the UHP electrodes from the heavy oil according to claim 1, wherein the needle coke has a true density of more than 2.13 g/cm$^3$, an ash content of less than or equal to 0.3, and a coefficient of thermal expansion (CTE) of less than or equal to $1.15 \times 10^{-6}$/° C. at 25° C. to 600° C.

* * * * *